United States Patent [19]

Henson et al.

[11] Patent Number: 5,940,562

[45] Date of Patent: *Aug. 17, 1999

[54] STUBLESS OPTOELECTRONIC DEVICE RECEPTACLE

[75] Inventors: Gordon D. Henson, Lake Elmo; Robert S. Reylek, Minneapolis; Barry S. Carpenter, Oakdale, all of Minn.

[73] Assignee: Minnesota Mining and Manufacturing Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/819,247

[22] Filed: Mar. 17, 1997

Related U.S. Application Data

[63] Continuation-in-part of application No. 08/614,412, Mar. 12, 1996, Pat. No. 5,778,123.

[51] Int. Cl.[6] ................................................. G02B 6/38
[52] U.S. Cl. ............................... 385/88; 385/89; 385/94; 385/92
[58] Field of Search .................................. 385/88, 89, 92, 385/134

[56] References Cited

U.S. PATENT DOCUMENTS

| | | | |
|---|---|---|---|
| 3,920,432 | 11/1975 | Smith | 65/4 |
| 4,289,558 | 9/1981 | Eichenbaum et al. | 156/179 |
| 4,980,007 | 12/1990 | Ferguson | 156/179 |
| 5,249,245 | 9/1993 | Lebby et al. | 385/89 |
| 5,257,332 | 10/1993 | Pimpinella | 385/59 |
| 5,265,184 | 11/1993 | Lebby et al. | 385/132 |
| 5,271,083 | 12/1993 | Lebby et al. | 385/130 |
| 5,291,572 | 3/1994 | Blonder et al. | 385/94 |
| 5,337,391 | 8/1994 | Lebby | 385/88 |
| 5,359,686 | 10/1994 | Galloway et al. | 385/49 |
| 5,432,630 | 7/1995 | Lebby et al. | 359/152 |
| 5,499,311 | 3/1996 | DeCusatis | 385/89 |
| 5,539,848 | 7/1996 | Galloway | 385/89 |
| 5,550,941 | 8/1996 | Lebby et al. | 385/49 |
| 5,625,732 | 4/1997 | Chun et al. | 385/88 |
| 5,625,734 | 4/1997 | Thomas et al. | 385/88 |
| 5,768,456 | 6/1998 | Knapp et al. | 385/49 |
| 5,778,123 | 7/1998 | Hagan et al. | 385/76 |
| 5,790,733 | 8/1998 | Smith et al. | 385/88 |

FOREIGN PATENT DOCUMENTS

| | | | |
|---|---|---|---|
| 0 550 973 A1 | 7/1993 | European Pat. Off. | G02B 6/42 |
| WO 94/05749 | 3/1994 | WIPO | C10M 171/00 |
| WO 94/28448 | 12/1994 | WIPO | G02B 6/00 |
| WO 95/34836 | 12/1995 | WIPO | G02B 6/42 |
| WO 97/20344 | 6/1997 | WIPO | H01L 21/50 |

OTHER PUBLICATIONS

Bona, G.L. et al., "Parallel Optical Links With 50 μm Ribbon Fibers: Laser Array Concepts and Fiber Skew Analysis," Proceedings of the 20th European Conference on Optical Communication, vol. 2, pp. 829–832 (1994) No month.

Primary Examiner—Rodney Bovernick
Assistant Examiner—Ellen E. Kang
Attorney, Agent, or Firm—Nestor F. Ho; H. Sanders Gwin, Jr.

[57] ABSTRACT

A stubless optoelectronic device receptacle for connecting multifiber optical ribbon cables to optoelectronic semiconductor components is provided. The optoelectronic device receptacle consists of a receptacle alignment block portion contained in the receptacle body. The alignment block has a connector coupling surface for engaging the fiber optic ribbon connector. An optoelectronic semiconductor component is fixedly mounted to the connector coupling surface of the alignment block and a flexible circuit is then mounted to the electronic semiconductor component to provide power to the component. In the preferred embodiment, the alignment block contains mechanical features which perform precision alignment of the block to a connector attached to the fiber ribbon cable.

15 Claims, 5 Drawing Sheets

STUBLESS OPTOELECTRONIC DEVICE RECEPTACLE

RELATED APPLICATIONS

The present invention is related to U.S. patent application Ser. No. 08/660,358, filed Jun. 7, 1996, entitled OPTOELECTRONIC DEVICE RECEPTACLE AND METHOD OF MAKING SAME, issued as U.S. Pat. No. 5,790,733, the application which is assigned to the assignee of the present invention and the disclosure of which is herein incorporated by reference in this application.

The present invention is a continuation-in-part of referenced U.S. application Ser. No. 08/614,412, filed Mar. 12, 1996 entitled "Alignment Assembly for Multifiber or Single Fiber Optical Cable Connector", issued Jul. 7, 1998 as U.S. Pat. No. 5,778,123.

FIELD OF THE INVENTION

The present invention relates generally to connectors for optical fibers, and optical fiber ribbons, and to packaging and connectorization of optoelectronic devices used with the optical fibers and fiber ribbons. In particular, the present invention relates to a connectorized receptacle for optoelectronic devices.

BACKGROUND OF THE INVENTION

Optical fiber ribbon cables are well known for the transmission of optical signals, such as is described in U.S. Pat. Nos. 3,920,432, 4,289,558 and 4,980,007. As the demands on communication media continue to increase, the advantages of using optical cables for transmission of signals and for interconnecting local devices, continue to grow. With this growth comes the need to connect ribbon cables to a multiplicity of devices.

Optoelectronic device receptacles are necessary components when such ribbon cables are to be connected to equipment, circuit boards and the like. These receptacles provide the interface between the fiber optic cable and the semiconductor optoelectronic devices that generate or detect optical signals. They provide the location for conversion between optical and electrical signals. The receptacle serves as a housing or package for the optoelectronic device, protecting it from the environment. If the receptacle is connectorized, it provides a releasable mechanical mating mechanism that accepts the connector on the optical fiber cable. The receptacle provides optical coupling between the optoelectronic device and the fiber cable, and typically provides means for making electrical contact to the device and thermal contact for cooling the device.

Connecting optoelectronic components such as photodiodes, LED's or lasers to the ends of fiber optic cables has in the past been a difficult and expensive task. This is due to the fact the light emitting and detecting areas on the optoelectronic devices, and the optical cores of the optical fibers, are very small in size. Therefore, precision alignment between devices and fibers is required. An alignment tolerance of about 10 $\mu$m is required for good optical coupling in a system based on 62.5 $\mu$m core multimode fiber, and an alignment tolerance of about 1 $\mu$m is required for 8 $\mu$m core single mode fiber. Maintaining precision alignment is an issue not only in the initial placement of the optoelectronic component in the receptacle, but also in the design of the receptacle to maintain alignment throughout the operating temperature range and in the presence of mechanical forces resulting from vibration, connection or pulling of the cable.

Optical coupling between an optoelectronic device and an optical fiber in the connectorized cable can be obtained in a variety of ways. In principle, a cleaved or lensed fiber end, held in the cable connector, could be positioned in close proximity and alignment to the optically active area of the semiconductor optoelectronic device. However, having an optoelectronic device not protected from the surrounding environment when the connector is not inserted in the receptacle is not practical. An unprotected optoelectronic device is unacceptable with the devices currently in use because they are degraded by the contact with open air, and can be easily damaged by mechanical contact. Therefore, in known receptacles, devices are typically enclosed in a hermetically-sealed windowed package (e.g. a standard TO can which is known to those skilled in the art) before being mounted in the receptacle, and optical coupling occurs through a flat or lensed window mounted in the package wall. Obtaining efficient optical coupling between the hermetically-packaged device and the fiber may require additional lenses outside the hermetic package. Of course, all of the components in the optical path must be precisely aligned in order to achieve maximum coupling.

The above approach, while useable, has several disadvantages. First of all, it does not make good use of the precision that is built into optoelectronic devices. As a result of the photolithographic and etching processes that are used to fabricate such devices, submicron physical features are possible. Although these features could in principle be used to aid in alignment to fibers, this is not possible in the typical packaging approach discussed above. This is due to the fact that when these devices are mounted in standard hermetically sealed packages, they are not precisely placed in the packages; therefore the package body cannot be used as a reference surface to position the package precisely in the receptacle. Having thus lost the precision originally built into the device, the active area of the device must be optically aligned to the fiber actively. That is, the device must be energized and robotically moved into the position of maximum optical coupling. This type of active alignment process is slow and expensive.

Another disadvantage of the traditional approach is that it is not well-suited to fiber ribbon systems. A key reason for this is that the spacing between optical fibers in a ribbon cable is small, typically 250 microns. Therefore, due to size constraints, individual TO-style packages cannot be used. Packaging an array of devices in a single windowed package is also impractical. This is due to the difficulty associated with producing either a single optical element, or an array of micro-optical lenses, which can couple an array of fibers (at 250 micron pitch) to an array of devices, while maintaining high efficiency and low channel-to-channel optical crosstalk.

Several solutions have been proposed for optically coupling an array of optoelectronic devices to an optical fiber ribbon. The existing techniques generally fall into two categories. The first technique involves passive alignment of an alignment block to a substrate surface and therefore is generally easier to manufacture, but is more imprecise and therefore not adequate for achieving reproducible high-efficiency optical coupling between devices and optical fiber, especially in the case of single-mode fiber. The second technique generally involves active alignment of an optoelectronic component to a surface on an alignment block and therefore is more difficult and expensive to manufacture, but is more precise and effective in achieving reproducible, low-loss optical coupling.

Examples of the first technique are shown in PCT Appl. No. PCT/US94/05749 to Swirhun, et al. and in Bona, G. L.

et al., Parallel Optical Links With 50 μm Ribbon Fibers: Laser Array Concepts and Fiber Skew Analysis, Proceedings of the 20th European Conference on Optical Communication, 1994, Vol. 2, pp. 829–832. In each of these systems, the optoelectronic component (generally an array of optoelectronic elements) is mounted on a substrate surface and electrically connected thereto. The substrate surface is provided with one or more mechanical alignment features (e.g., holes, slots or channels) which mate with alignment features of an alignment block carrying a plurality of fiber optic stubs. In this way, there is a passive, mechanical alignment of the fiber optic stubs in the alignment block with the optoelectronic elements of the optoelectronic component.

While this technique is well-suited for lower performance interconnections with fibers having large core sizes (e.g. 62.5 μm core standard multi-mode fiber), the inherent mechanical tolerances of the mechanical alignment features tend to limit the use of these techniques in higher performance, small-core fiber interconnections. In addition, the need to mount the optoelectronic device on a substrate surface imposes difficulties in producing an optoelectronic receptacle which can be connectorized in a plane of orientation parallel to the plane of the circuit board on which the device is to be mounted.

The Bona reference specifically discloses a parallel optical link for butt-coupling an optical component. Alignment is accomplished via alignment pins. While alignment pins are satisfactory for general alignment, they have significant disadvantages when precision alignment is required, especially for wide multifiber interfaces. In particular, the alignment of two connector alignment blocks via two pins suffers from the problem that the system is mechanically overconstrained. That is, the pins may prevent the faces of the two connector blocks from coming into intimate contact if the pins are not perfectly perpendicular to the block face. The Bona reference also discloses an optical link having optical fibers extending only a portion of the way through the optical link.

Examples of the second technique are shown in U.S. Pat. Nos. 5,359,686 to Galloway et al., 5,271,083 to Lebby, et al. and 5,265,184 to Lebby et al.. In these systems, the optoelectronic component is mounted directly on the alignment block, typically by use of a transparent contact adhesive or by solder bump bonding. The alignment block in each case is comprised of a plurality of molded waveguides encased in an injection-molded, plastic alignment block. In all of these patents, the plastic alignment block also includes electrical contacts on the surface to which the optoelectronic component is to be mounted for providing electrical power to the optoelectronic component. The electrical contacts are integrated into the plastic alignment block and connected to a leadframe extending therefrom.

The use of molded plastic waveguides or a molded plastic alignment block containing both the waveguides and the electrical contacts is disadvantageous for a number of reasons. First, the molded waveguides, while optically tuned to the particular optical fiber of a fiber optic ribbon, will be of an optically different material and there will necessarily be optical loss by virtue of this difference in materials. Second, the alignment block will be limited by the thermal and mechanical properties of the molded plastic (e.g. thermal expansion and thermal conductivity), which in some cases are not sufficient for higher performance applications. Finally, the integrated electrical contacts tend to create noise and interference at high operational frequencies, which also limits the application of this technique in high speed performance environments.

While existing techniques for creating receptacles for optoelectronic components in order to connectorize the optoelectronic component to an optical fiber ribbon have been effective for lower performance it would be desirable to provide an optoelectronic device receptacle and method of making the same which overcame the disadvantages of the existing techniques and which was more cost effective and easier to manufacture.

SUMMARY OF THE INVENTION

The present invention discloses a stubless optoelectronic device receptacle for connecting multifiber optical ribbon cables to optoelectronic semiconductor components. The optoelectronic device receptacle consists of a receptacle alignment block portion contained in the receptacle body. The alignment block has a connector coupling surface for engaging the fiber optic ribbon connector. An optoelectronic semiconductor component is fixedly mounted to the connector coupling surface of the alignment block and a flexible circuit is then mounted to the optoelectronic semiconductor component to provide power to the component. In the preferred embodiment of the present invention, the alignment block contains mechanical features which perform precision alignment of the block to a connector attached to the fiberoptic ribbon cable.

A method of fabricating an alignment block is also disclosed in the present invention. The method includes the steps of providing a reference plate and placing a flexible circuit on the reference plate. An optoelectronic semiconductor component is then aligned with respect to the reference plate. The optoelectronic component is then placed and bonded onto the flexible circuit. An alignment block is then placed on the reference plate, which locates the alignment block relative to the optoelectronic component and the flex circuit. The alignment block is then placed and bonded to the flex circuit and the optoelectronic component.

BRIEF DESCRIPTION OF THE DRAWINGS

FIG. 4b is an enlarged perspective view of the circle portion of FIG. 4a.

DETAILED DESCRIPTION OF THE DRAWINGS

The present invention is an optoelectronic device receptacle for connecting multifiber optical ribbon cables to optical semiconductor components, and a method for making the same. The device receptacle is made from an alignment block to which optoelectronic semiconductor components are bonded, and a receptacle body for mating to a connector on the end of a fiber optic ribbon cable. A flexible electrical circuit for providing electrical connection to the optical semiconductor components is also provided in the present invention. The present invention eliminates the need for fiber stubs or waveguides in the alignment block, thus eliminating the expense of the additional fibers, the additional costs of manufacturing an alignment block having fiber stubs and the cost in time of preparing the fiber ends associated with fiber stubs.

Figure 1:
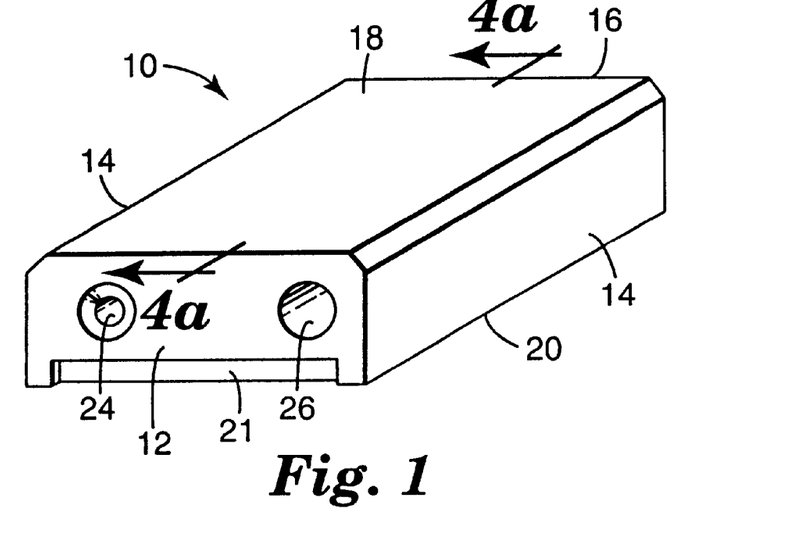
FIG. 1 is a perspective view of an alignment block according to the present invention.

An alignment block 10 made according to the present invention is illustrated in FIG. 1. Alignment block 10 is preferably made of ceramic, but may also be manufactured from plastic or metal materials. Alignment block 10 includes a connection coupling surface 12, side surfaces 14, a rear surface 16, a top surface 18 and a bottom surface 20. Connector coupling surface 12 includes a recessed portion 21 for receiving an optoelectronic device as will be described in detail below. Recessed portion 21 is preferably recessed approximately 50 microns, however greater or lesser depths could also be used without departing from the spirit or scope of the present invention. Recess portion 21 is provided to avoid damage to a flex circuit, the optoelectronic device and the fibers in a connecting optical ribbon cable.

An alignment means is also provided on coupling surface 12. In the preferred embodiment of the present invention, the alignment means is a base and socket alignment means. As illustrated in FIG. 1, first and second receiving cavities 24, 26 respectively, are provided in connector coupling surface 12 for alignment purposes as will be described in greater detail below.

Figure 2:
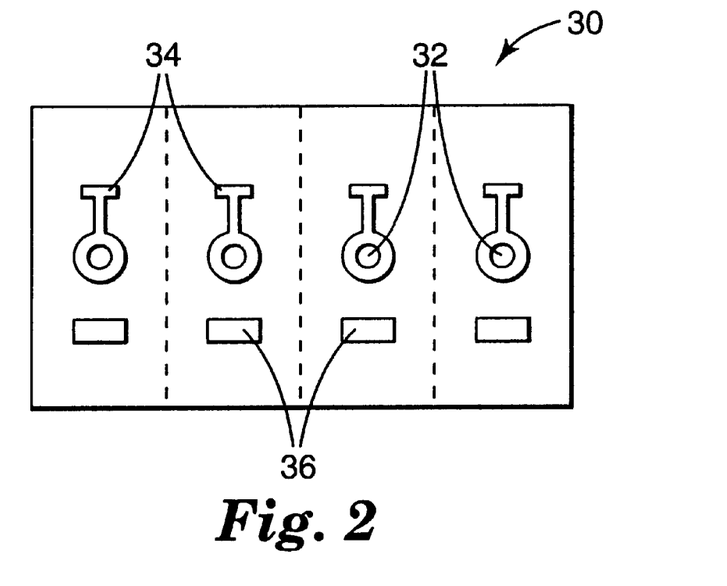
FIG. 2 is a front plan view of a known semiconductor light emitting device.

FIG. 2 is a front plan view of a known semiconductor light emitting component 30. The present invention is designed to interface with a number of different light emitting components such as LEDs, laser arrays, edge-emitting lasers, superluminescent diodes, vertical cavity surface emitting lasers (VCSELs), and other surface emitting devices. Additionally, the present invention may interface with a number of different optoelectronic detectors. In the preferred embodiment, component 30 is a VCSEL. As illustrated in FIG. 2, VCSEL 30 is comprised of a number of individual lasers joined to form an array. The array has a plurality of active regions 32 from which light is projected, and electrical contact pads 34, 36 for providing power to the device.

Figure 3:
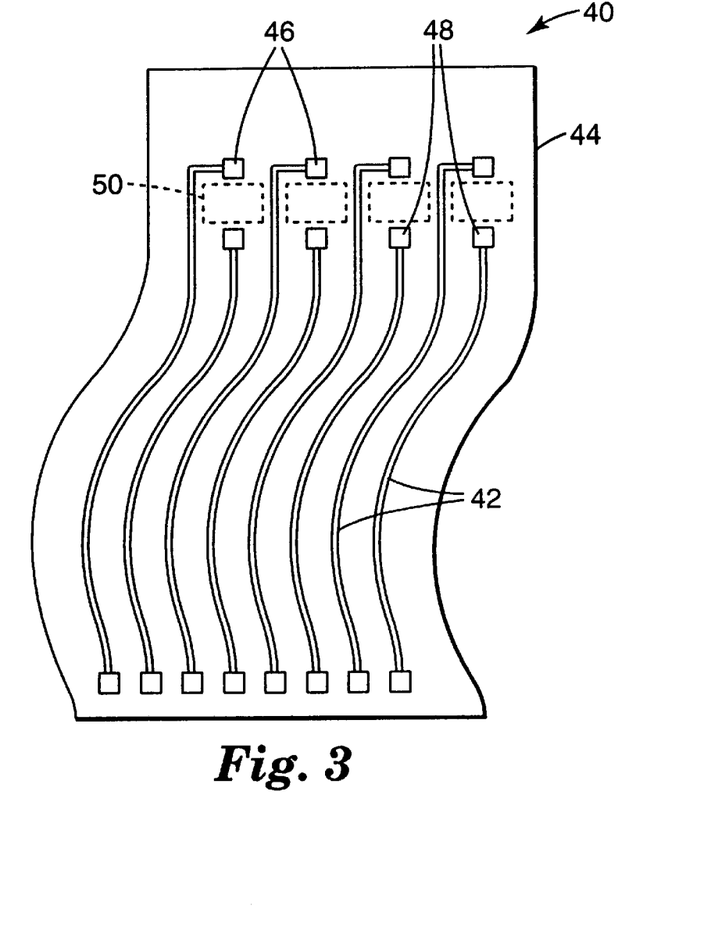
FIG. 3 is a side elevational view of a flexible electronic circuit according to the present invention.

FIG. 3 illustrates a flexible circuit 40 for connection between VCSEL 30 and alignment block 10. Flexible circuit 40 consists of metal traces 42 patterned on a thin flexible polymeric substrate 44. Flexible circuit 40 also contains contact pads 46, 48. Electrical contact to contact pads 34, 36 on VCSEL 30 is made by aligning the contact pads on the VCSEL to contact pads 46, 48 on the flexible circuit, and bonding the pads together. The bonding of flexible circuit 40 to VCSEL 30 is preferably done by compression bonding or solder reflow, but it should be noted that any other known bonding method may be used without departing from the spirit or scope of the present invention. Electrical contact between the VCSEL and external electronics can then be made via conducting traces 42 on flexible circuit 40.

In the preferred embodiment of the present invention, flexible circuit 40 is made of a suitable material such as, for example, polyimide or polyester. If desired, windows 50 can be cut out of flexible circuit 40, as illustrated in dashed lines in FIG. 3. The windows 50 allow VCSEL 30 to launch light unimpeded to a fiber optic ribbon cable.

Figure 4A:
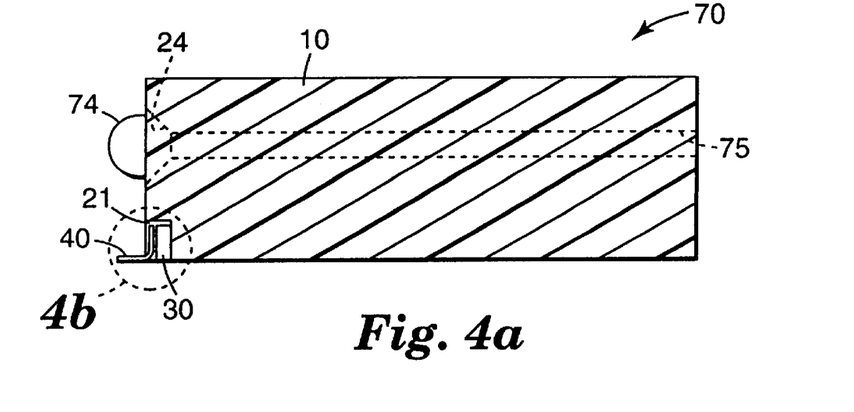
FIG. 4a is a cross-sectional view taken along line 4—4 of FIG. 1 having a semiconductor optoelectronic device mounted thereto and a flexible electronic circuit to make electrical contact to the semiconductor device.
Figure 4B:
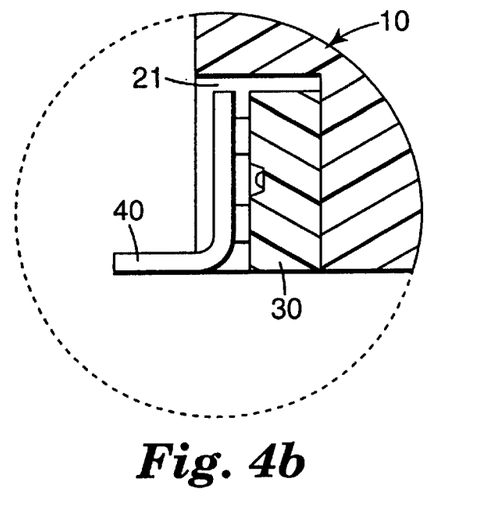

A receptacle subassembly 70 is shown schematically in FIGS. 4a and 4b. Subassembly 70 comprises alignment block 10 having flexible circuit 40 and VCSEL 30 bonded in place. An alignment ball 74 is bonded into cavity 24 as will be discussed in greater detail below.

Referring to FIGS. 1 and 4a, first receiving cavity 24 is machined to form a chamfer for receiving and for having secured inside it a portion of alignment ball 74. Second receiving cavity 26 (not shown in FIG. 4a) is sized to receive a substantial portion of alignment ball 74, as will be described in detail below. In the preferred embodiment of the present invention, a bore 75 is provided to receiving cavity 24 to allow the introduction of a bonding agent. Bore 75 may be formed to come through the length of alignment block 10 as shown in FIG. 4a, or it may go through the side of alignment block 10. In one embodiment, first and second receiving cavities may extend through the length of alignment block 10. Once alignment ball 74 has been seated in the chamfer, a bonding agent is introduced through channel 75 to secure ball 74 in place. It should be noted that the bonding agent could be directly applied to the chamfer and the alignment ball then inserted as long as the bonding agent is uniformly applied so that alignment ball 74 accurately seats in the chamfer. At this point, specific reference should be made to assignee's copending U.S. patent application Ser. No. 08/614,412, filed Mar. 12, 1996, entitled "ALIGNMENT ASSEMBLY FOR MULTIFIBER OR SINGLE FIBER OPTICAL CABLE CONNECTOR", issued as U.S. Pat. No. 5,778,123, the disclosure of which is herein incorporated by reference.

As stated above, alignment ball 74 is provided for insertion into receiving cavity 24. Ball 74 is provided to precisely align the alignment block to a ribbon cable connector. Alignment ball 74 is preferably a highly precise steel ball bearing but could also be formed from other materials having the precision of a steel ball bearing such as tungsten carbide, ceramic, metal or plastic, such as liquid crystal polymer, without departing from the spirit of scope of the invention. Other bonding agents may also be used without departing from the spirit or scope of the present invention.

The chamfer of first receiving cavity 24 preferably is formed to retain less than one half of alignment ball 74. Second receiving cavity 26 is sized to slidingly engage and receive more than half of alignment ball 74. This insures that when two devices are coupled together alignment ball 74 is entirely encompassed by both devices and the devices are constrained from movement in a multitude of directions. Numerous alternative embodiments of the receiving cavities and alignment balls may be made without departing from the spirit or scope of the invention.

Figure 5:
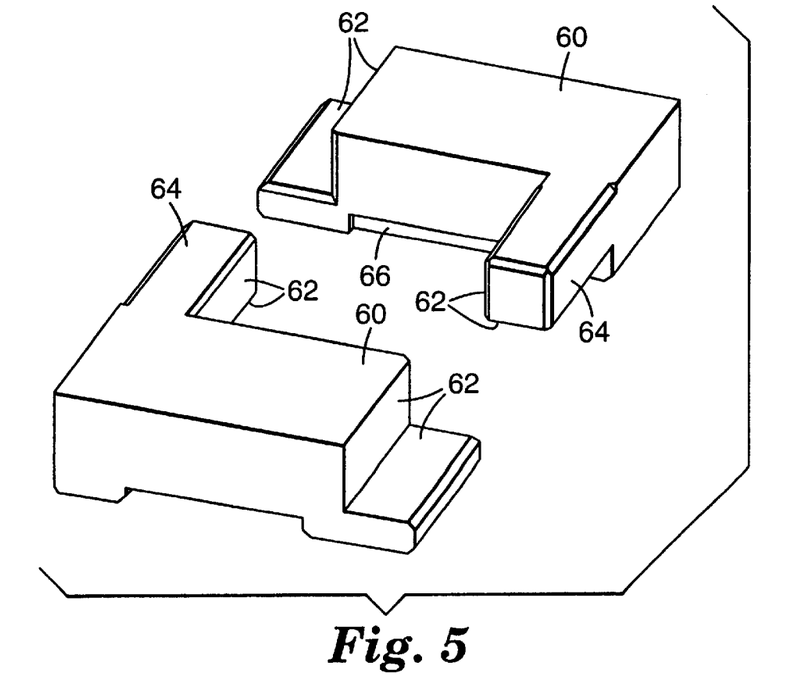
FIG. 5 is a perspective view of an alignment block having an alternative alignment means.

It should be noted that numerous other alignment methods may be used without departing from the spirit or scope of the present invention. For example, an alignment pin could be used in place of alignment ball 74, for sliding engagement with a chamfered cavity. Another alignment technique is illustrated in FIG. 5. As illustrated, alignment blocks 60 are provided having an alignment edges 62 and an alignment projections 64. As with alignment block 10, a recessed portion 66 is provided to mount a flexible circuit and an optoelectronic device. Alignment is achieved by abutting the alignment projection of one block with the alignment edge of another.

Figure 6:
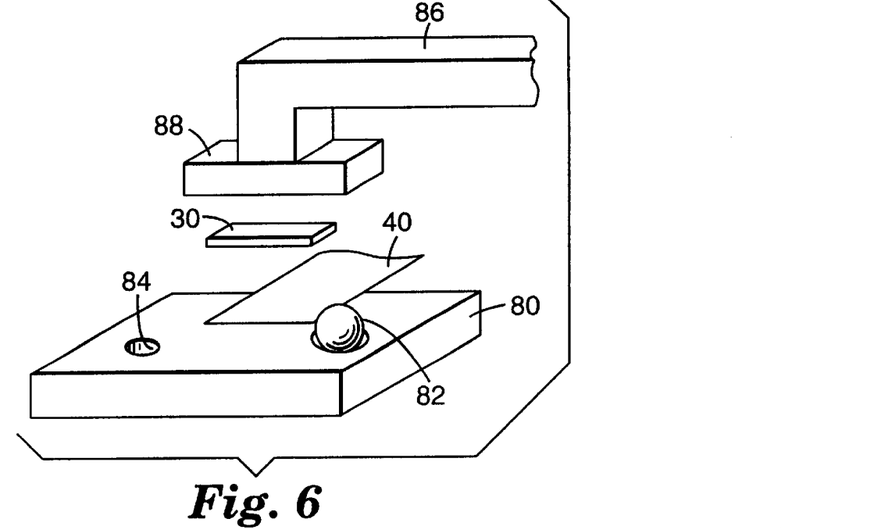
FIG. 6 is a perspective view of an alignment device for aligning the optoelectronic devices to the flexible circuit.
Figure 7:
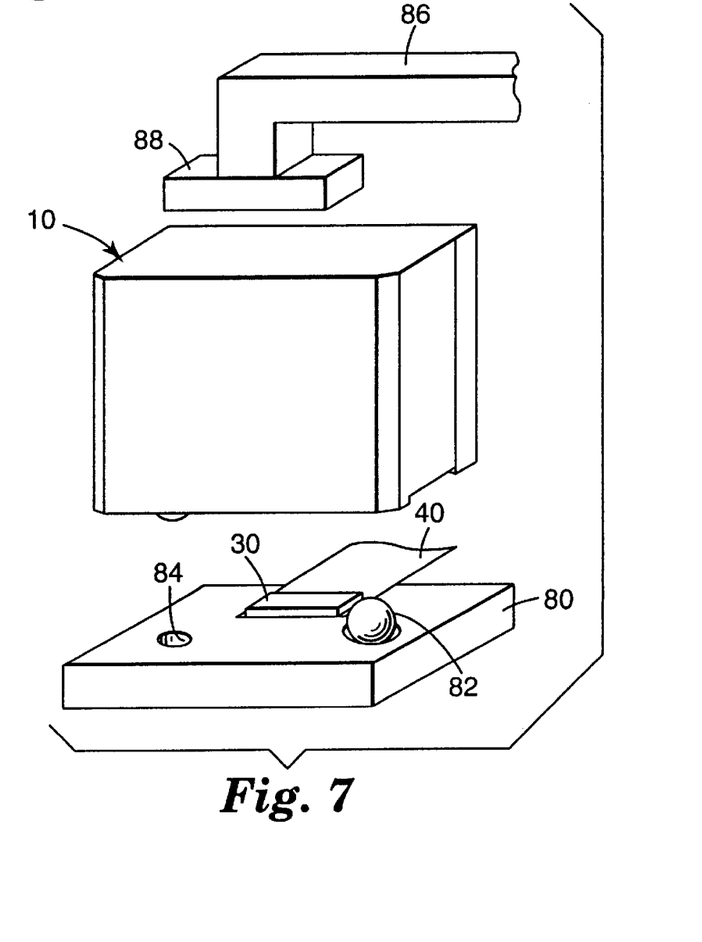
FIG. 7 is a further perspective view of an alignment device for aligning the alignment block to the optoelectronic devices and the flex circuit.

Alignment of VCSEL 30 to an appropriate position of connector coupling surface 12, and attachment of flexible circuit 40 and VCSEL 30 to alignment block 10 is preferably performed in a robotic assembly apparatus such as shown in FIGS. 6 and 7. In a preferred embodiment, a reference plate 80 is provided including reference plate alignment ball 82 which fits into receiving cavity 26 in alignment block 10, and with reference plate receiving cavity 84 which accepts alignment block alignment ball 74. However, it should be noted that reference plate 80 is not the only alignment method, and other alignment means may be employed to align VCSEL 30 and flexible circuit 40 to coupling surface 12.

In the preferred embodiment of the present invention, flexible circuit 40 is placed on reference plate 80. Flexible circuit is aligned on reference plate 80 by any number of alignment techniques such as using a physical registration notch, positioning the flexible circuit in the corner of plate 80, or optical alignment including visual inspection and the use of a prism and fiducial marks. The exact alignment of flexible circuit 40 is not crucial as it provides only gross alignment. Flexible circuit 40 may then be held in place by a vacuum or by a clamping device (not shown).

A first robotic positioning arm 86, equipped with a vacuum chuck 88 is then used to pick up VCSEL 30. The VCSEL is precisely registered in the chuck at the time it is picked up by the chuck. Registration may be performed using a vision system which aligns fiducial marks on VCSEL 30 to fiducial marks on chuck 88, or using mechanical registration between features on the chuck and features on the VCSEL. Robotic arm 86 then places VCSEL 30 on flexible circuit 40, by positioning VCSEL 30 with respect to reference plate alignment ball 82 and reference plate receiving cavity 84. VCSEL 30 and flexible circuit 40 are then bonded together by solder reflow such that contact pads 34 and 36 are bonded to contact pads 46 and 48.

A second robotic arm 90, equipped with a vacuum chuck 92 is then provided, as illustrated in FIG. 7, to pick up alignment block 10. Alignment block 10 is then placed on the bonded combination of flexible circuit 40 and VCSEL 30. Because of the ball and sockets, precise fine alignment is provided. Once alignment block 10 is positioned on flexible circuit 40 and VCSEL 30, the combination is bonded together by known bonding techniques.

Figure 8:
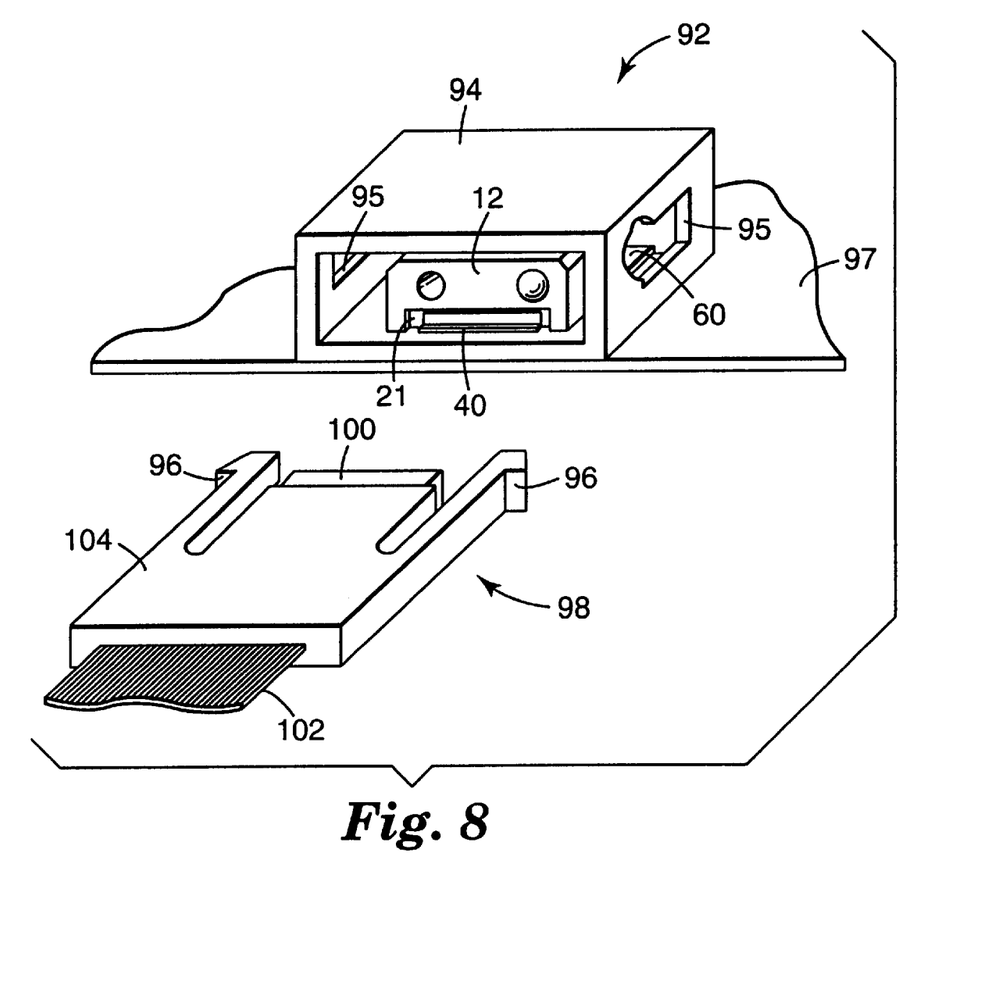
FIG. 8 is a partially exploded simplified perspective view of an optoelectronic device receptacle according to the present invention installed in an application.

An optoelectronic device receptacle 92 is shown in FIG. 8. The receptacle is completed by enclosing the alignment block, flexible circuit and VCSEL in a receptacle body 94. Receiving slots 95 are provided in receptacle body 94 for receiving portions of a latching mechanism 96, as will be described below. Receptacle 92 may be mounted to a circuit board 97 by any commonly known mounting means such as adhering, press fitting, molding, mechanical latching or the like. It will be seen that, unlike many existing optoelectronic receptacles, receptacle 92 can be mounted on circuit board 97 such that the plane of orientation of the optical connection is parallel to the plane of the substrate surface of circuit board 97.

FIG. 8 also illustrates a preferred connector 98 which is adapted for connection with receptacle 92. Connector 98 is comprised of a connector alignment block 100 which is attached to a fiber optic ribbon cable 102, and a connector body 104 which includes latch mechanism 96. Connector alignment block 100 has first and second receiving cavities and an alignment ball as in the receptacle alignment block, but they are not seen in FIG. 8. Latch mechanism 96 is inserted into receiving slots 95 to releasably latch connector 98 to receptacle 92. Latch mechanism 96 provides mechanical force to keep connector 98 mated with alignment block 10. While the latch mechanism provides the force to keep the parts mated, the alignment balls provide the precise alignment.

The invention is not to be taken as limited to all of the details thereof as modifications and variations thereof may be made without departing from the spirit or scope of the invention.

We claim:

1. An optoelectronic device receptacle comprising:
   a fiberless receptacle alignment block portion having a connector coupling surface configured to receive a connector having at least one optical fiber;
   an optoelectronic component positioned to be directly aligned to the optical fiber and fixedly mounted directly to the connector coupling surface of the receptacle alignment block; and
   a flexible circuit connected to the optoelectronic component, wherein the flexible circuit at least partially covers an exposed portion of the optoelectronic component.

2. The receptacle of claim 1, wherein the flexible circuit comprises a polymer film having a plurality of electrical lines containing thereon, and wherein the flexible circuit has a plurality of electrical conductive pads thereon for electrically connecting to the optoelectronic component.

3. The device receptacle as in claim 1, further comprising alignment features for aligning the receptacle alignment block with a connector.

4. The device receptacle as in claim 1, further comprising alignment features for aligning the receptacle alignment block with a connector, wherein the alignment features comprise first and second receiving cavities in the connector coupling surface of the alignment block portion wherein the first receiving cavity is sized to retain an alignment ball and a second receiving cavity is sized to slidingly fit about the alignment ball, wherein the second cavity has a depth $d_2$ and a radius $r_2$; and the alignment ball has a radius R, wherein $R<d_2$ and $R<r_2$.

5. The device receptacle as in claim 1, wherein the optoelectronic component is selected from the group consisting of one or more of: laser arrays, edge emitting lasers, superluminescent diodes, vertical cavity surface emitting lasers, light emitting diodes, and optical detectors.

6. The device receptacle as in claim 1, wherein the connector coupling surface has a recessed portion and the optoelectronic component is mounted within the recessed portion and the flexible circuit covers exposed portions of the optoelectronic component.

7. The device receptacle as in claim 1, wherein the flexible circuit has at least one window formed therethrough and the window is aligned to allow unimpeded light transmission between the optical fiber and the optoelectronic component.

8. An optoelectronic device receptacle comprising:
   an optical fiberless receptacle alignment block portion having a connector coupling surface wherein the connector coupling surface has a recessed portion;
   an optoelectronic component fixedly mounted directly in the recessed portion of the connector coupling surface of the receptacle alignment block; and
   a flexible circuit mounted to the optoelectronic component, wherein the flexible circuit at least partially covers an exposed portion of the optoelectronic component.

9. The receptacle of claim 8, wherein the flexible circuit comprises a polymer film having a plurality of electrical lines containing thereon, and wherein the flexible circuit has a plurality of electrical conductive pads thereon for electrically connecting to the optoelectronic component.

10. The device receptacle as in claim 8, further comprising alignment means for aligning the receptacle alignment block with a connector.

11. The device receptacle as in claim 10, wherein the alignment means comprise first and second receiving cavities in the connector coupling surface of the alignment block portion wherein the first receiving cavity is sized to retain an alignment ball and a second receiving cavity is sized to slidingly fit about an alignment ball, wherein the second cavity has a depth $d_2$ and a radius $r_2$ and the alignment ball has a radius R, wherein $R<d_2$ and $R<r_2$.

12. The device receptacle as in claim 8, wherein the optoelectronic component is selected from the group consisting of one or more of laser arrays, edge emitting lasers, superluminescent diodes, vertical cavity surface emitting lasers, light emitting diodes, and optical detectors.

13. The device receptacle as in claim 8, wherein the flexible circuit has at least one window formed therethrough and the window is aligned to allow unimpeded light transmission between the optical fiber and the optoelectronic component.

14. A method of making an optical fiberless device receptacle subassembly having an alignment block portion and an optoelectronic component and a flexible circuit, the method comprising the steps of:

provide a reference plate including a reference plate alignment ball and a reference plate alignment cavity;

providing a flexible circuit having electrical contacts;

aligning the flexible circuit on the reference plate;

providing an optoelectronic component having electrical contacts;

aligning the optoelectronic component with the flexible circuit with respect to the reference plate alignment ball;

placing the optoelectronic component on the flexible circuit, wherein the flexible circuit covers at least an exposed portion of portion of the optoelectronic component;

bonding the electrical contacts of the optoelectronic component to the electrical contacts of the flexible circuit;

providing an alignment block having a block alignment ball and a block alignment cavity, wherein the block alignment cavity has a depth $d_2$ and a radius $r_2$; and the reference plate alignment ball has a radius R, wherein $R<d_2$ and $R<r_2$;

aligning the alignment block with respect to the reference plate by aligning the reference plate alignment ball with the block alignment cavity and the block alignment ball with the reference plate alignment cavity;

placing the alignment block on the bonded optoelectronic component and flexible circuit; and bonding the alignment block to the optoelectronic component and flexible circuit.

15. The method as in claim 14 wherein the step of aligning the alignment block with respect to the reference plate is carried out with an alignment block having an alignment block alignment ball that slidingly fits into the reference plate receiving cavity and an alignment block receiving cavity that slidingly receives the reference plate alignment ball.

* * * * *

UNITED STATES PATENT AND TRADEMARK OFFICE
CERTIFICATE OF CORRECTION

PATENT NO. : 5,940,562

DATED : August 17, 1999

INVENTOR(S) : Gordon D. Henson, Robert S. Reylek, and Barry S. Carpenter

It is certified that error appears in the above-identified patent and that said Letters Patent is hereby corrected as shown below:

On the title page: Item

[56] References Cited should include the following patents:

| | | | |
|---|---|---|---|
| 5,500,910 | 3/19/96 | Boudreau et al | 385/24 |
| 5,598,494 | 1/28/97 | Behrmann et al | 385/59 |

Signed and Sealed this

First Day of February, 2000

Attest:

Attesting Officer

Q. TODD DICKINSON

Acting Commissioner of Patents and Trademarks